United States Patent [19]

Ishibashi

[11] Patent Number: 4,657,297
[45] Date of Patent: Apr. 14, 1987

[54] REAR SEAT APPARATUS FOR AUTOMOBILE

[75] Inventor: Sadao Ishibashi, Hiroshima, Japan

[73] Assignee: Mazda Motor Corporation, Hiroshima, Japan

[21] Appl. No.: 854,815

[22] Filed: Apr. 23, 1986

[30] Foreign Application Priority Data

Apr. 25, 1985 [JP] Japan ................... 60-89485
Apr. 26, 1985 [JP] Japan ................... 60-90629
Apr. 26, 1985 [JP] Japan ............. 60-62998[U]

[51] Int. Cl.$^4$ .............................................. B60N 1/02
[52] U.S. Cl. ................................ 296/63; 296/65 R; 297/379; 297/410
[58] Field of Search ............ 296/63, 65 R, 37.16; 297/379, 410

[56] References Cited

U.S. PATENT DOCUMENTS

| 4,286,819 | 9/1981 | Inoue et al. | 296/65 R |
| 4,518,201 | 5/1985 | Wahlmann et al. | 296/65 R |
| 4,536,027 | 8/1985 | Brennan | 297/379 |
| 4,561,694 | 12/1985 | Mouri et al. | 297/379 |

FOREIGN PATENT DOCUMENTS

59-70834  5/1984  Japan .
59-88331  6/1984  Japan .
59-91832  6/1984  Japan .

*Primary Examiner*—Robert R. Song
*Attorney, Agent, or Firm*—Gerald J. Ferguson, Jr.; Michael P. Hoffman; Ronni S. Malamud

[57] ABSTRACT

In a rear seat apparatus for an automobile comprising a rear seat constituted by a seat cushion, a seat back and a head rest secured to a vehicle body, a forwardly projecting support section is formed on the vehicle body at a position corresponding to an upper portion of the seat back. A recess section for receiving the support section is formed on a rear surface of the seat back. The head rest is constituted by a main body and stays extending downwardly of the mian body. The stays are inserted into support holes formed through the upper portion of the seat back and through the support section, thereby securing the seat back to the vehicle body.

12 Claims, 9 Drawing Figures

REAR SEAT APPARATUS FOR AUTOMOBILE

BACKGROUND OF THE INVENTION

1. Field of the Invention

This invention relates to a rear seat apparatus wherein a seat back of a rear seat of an automobile is secured to the vehicle body.

2. Description of the Prior Art

Various configurations have heretofore been employed for securing the rear seat of an automobile to the vehicle body. For example, as a configuration for communicating a passenger cabin with a luggage compartment by inclining the rear seat back forwardly, it has been proposed in Japanese Unexamined Utility Model Publication No. 59(1984)-70834 to position an engagement member between the seat back and the body, and to switch the seat back between the secured condition and the inclined condition by operating the engagement member. It has also been disclosed in Japanese Unexamined Utility Model Publication No. 59(1983)-91932 to provide a rear seat back lock device for restricting forward inclination of the seat back for preventing articles in the luggage compartment from being stolen. In the rear seat back lock device, a lock mechanism is positioned between the seat back and the body and is released by a knob operation to enable forward inclination of the seat back. Further, a keyoperated cylinder lock is provided on the seat back near the knob to disable knob releasing and to lock the seat back. Also, a sliding device for a rear seat back is proposed in Japanese Unexamined Utility Model Publication No. 59(1984)-88331. In the sliding device, the seat back is divided into upper and lower halves which are connected by a hinge so that the lower seat back half inclines and the upper half moves vertically as the seat cushion is moved.

However, in the aforesaid prior techniques, the configuration is complicated, and many parts are necessary.

On the other hand, in the case where the seat back is maintained in the condition secured to the body and is not inclined, the seat back and the head rest have heretofore been secured respectively to the body and the seat back frame. However, in order to secure the head rest firmly, it is necessary to improve rigidity of the seat back frame and to provide a configuration for securing the head rest.

SUMMARY OF THE INVENTION

The primary object of the present invention is to provide a rear seat apparatus for an automobile wherein a configuration for securing a seat back of a rear seat to a vehicle body and mounting a head rest is simple and rigid.

Another object of the present invention is to provide a rear seat apparatus for an automobile wherein a configuration for locking a seat back of a rear seat partitioning a passenger cabin from a luggage compartment is simple.

The specific object of the present invention is to provide a rear seat apparatus for an automobile of the type comprising a rear seat cushion slidable in the longitudinal direction of the body, wherein a mechanism for vertically sliding the seat back is eliminated and the configuration for mounting a head rest is simple.

The present invention provides a rear seat apparatus for an automobile in which a rear seat constituted by a seat cushion, a seat back and a head rest is secured to a vehicle body, wherein the improvement comprises:

(i) forming a forwardly projecting support section on said vehicle body at a position corresponding to an upper portion of said seat back, (ii) forming a recess section for receiving said support section on a rear surface of said seat back, (iii) constituting said head rest by a main body and stays extending downwardly of said main body, and (iv) inserting said stays into support holes formed through the upper portion of said seat back and through said support section, thereby securing said seat back to said vehicle body.

The present invention also provides a rear seat apparatus for an automobile in which a rear seat constituted by a seat cushion, a forwardly inclinable seat back, and a head rest mounted on an upper end portion of the seat back is secured to a vehicle body, and a passenger cabin and a luggage compartment are partitioned from each other by the rear seat, wherein the improvement comprises:

(i) forming a forwardly projecting support section on said vehicle body at a position corresponding to an upper portion of said seat back, (ii) forming a recess section for receiving said support section on a rear surface of said seat back, (iii) constituting said head rest by a main body and stays extending downwardly of said main body, (iv) supporting said stays by inserting them into support holes formed through the upper portion of said seat back and said support section, and (v) mounting a key-operated cylinder lock on either one of said head rest and said seat back, said lock being provided with a hook section for engagement with a locking section.

The present invention further provides a rear seat apparatus for an automobile in which a rear seat constituted by a seat cushion, a seat back and a head rest is mounted on a vehicle body, wherein the improvement comprises:

(i) forming a forwardly projecting support section on said vehicle body at a position corresponding to an upper portion of said seat back, (ii) forming a recess section for receiving said support section on a rear surface of said seat back, (iii) constituting said head rest by a main body and stays extending downwardly of said main body, (iv) inserting said stays into support holes formed through the upper portion of said seat back and through said support section, thereby securing said seat back to said vehicle body, (v) supporting said seat cushion for movement in the longitudinal direction of said vehicle body by a rail member, and (vi) supporting a lower end portion of said seat back on said seat cushion via a long hole, so that said seat back inclines around said support section for said stays when said seat cushion is moved forwardly in the longitudinal direction of said vehicle body.

In the first-mentioned rear seat apparatus of the present invention, since the seat back is secured to the vehicle body and the head rest is mounted simply by inserting the stays of the head rest into the support section of the vehicle body from above the seat back, the configuration is simple and it is possible to obtain a high head rest mounting strength. Also, since the number of parts required is small, the rear seat apparatus is advantageous from the viewpoint of cost and productivity.

Further, for the type in which the seat back is inclined for communication of the passenger cabin with the luggage compartment, it is possible to lock the inclination of the seat back by the head rest, good assembling characteristics are obtained, and no other inclination lock mechanism is required.

In the second-mentioned rear seat apparatus of the present invention, inclination of the seat back is made possible simply by moving the head rest upwardly and releasing the engagement of the stays with the support section. Further, since the hook section is engaged with the lock section by the locking with a key of the cylinder lock so that upward movement of the head rest and inclination of the seat back are locked, it becomes possible to ensure prevention of articles in the luggage compartment being stolen. Also, since the configuration is simple and the number of parts required is small, the apparatus is advantageous from the aforesaid viewpoint.

In the rear seat apparatus of the present invention mentioned last, since the seat back follows up the movement of the seat cushion in the longitudinal direction of the vehicle body by movement via a long slot and inclination around the support section, no particular sliding mechanism is required for the seat back, and the required movement is made possible by a simple configuration.

DESCRIPTION OF THE PREFERRED EMBODIMENTS

The present invention will hereinbelow be described in further detail with reference to the accompanying drawings.

Figure 1:
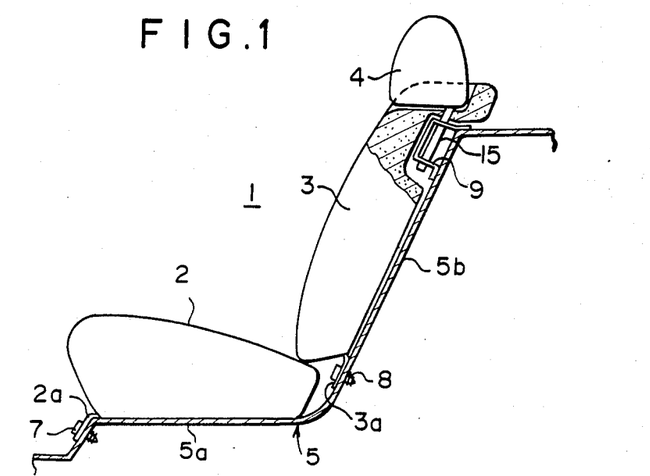
FIG. 1 is a partially sectional side view showing an embodiment of the rear seat apparatus in accordance with the present invention.
Figure 2:
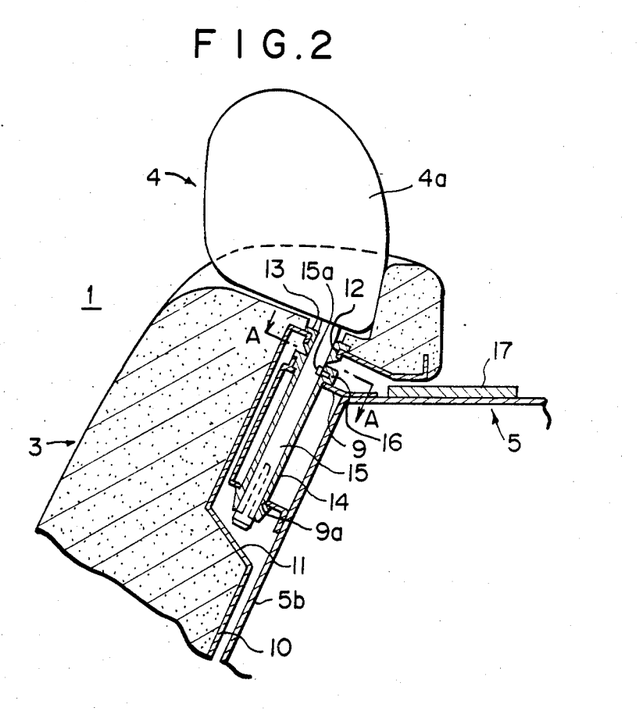
FIGS. 2 and 3 are a sectional side view and a sectional front view showing the upper section of the rear seat in the embodiment of FIG. 1.
Figure 3:
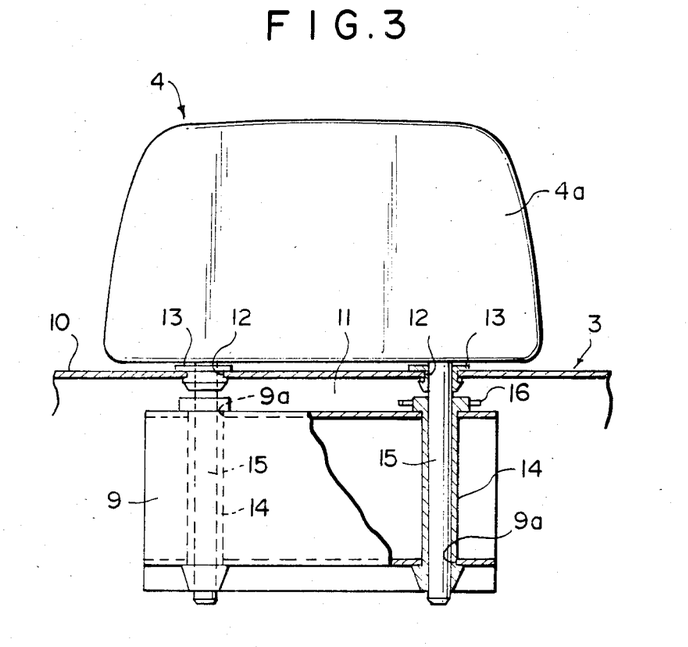

Referring to FIGS. 1, 2 and 3, a rear seat 1 comprises a seat cushion 2, a seat back 3 and a head rest 4, and is secured to a rear panel of a vehicle body 5.

The seat cushion 2 has a bracket 2a at a front end portion, and the bracket 2a is secured to a floor 5a of the vehicle body 5 by a fixing screw 7. The seat back 3 has a bracket 3a at a lower end portion, which is secured by a fixing screw 8 to the front surface of a rear package panel 5b of the vehicle body 5. An upper portion of the seat back 3 is secured by mounting of the head rest 4 to a support section 9 projecting forwardly of the vehicle body 5.

The seat back 3 has a recess section 11 formed by bending a seat frame 10 inwardly of the seat back 3 on the upper rear side. The forwardly projecting support section 9 is secured to the front surface of the rear package panel 5b of the vehicle body 5 at a position corresponding to the upper section of the seat back 3. The support section 9 is provided so that it fits into the recess section 11 of the seat back 3 and the rear surface of the seat back 3 is positioned along the front surface of the rear package panel 5b of the vehicle body 5. Further, support holes 12, 12 are perforated through the seat frame 10 defining the upper wall of the recess section 11 of the seat back 3, and ring-like bushings 13, 13 are fitted respectively to the inner circumferences of the support holes 12, 12. The support section 9 of the vehicle body 5 is of a channel shape and secured at its upper and lower edges to the vehicle body 5 so as to constitute a closed cross-section extending transversely to the vehicle body 5. Support holes 9a, 9a are vertically perforated through the support section 9, and cylindrical plastic guide members 14, 14 are fitted respectively to the support holes 9a, 9a.

The head rest 4 comprises a main body 4a and stays 15, 15 extending downwardly of the main body 4a. The stays 15, 15 are inserted into the support holes 12, 12 of the seat back 3 and the support holes 9a, 9a of the support section 9, i.e. into the bushings 13, 13 and the guide members 14, 14.

Figure 4:
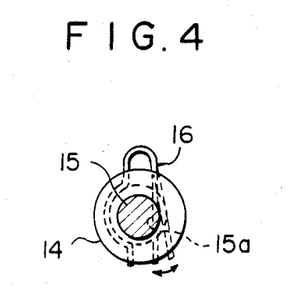
FIG. 4 is a sectional view taken along line A—A of FIG. 2.

A clip-like spring 16 as shown in FIG. 4 is positioned at the upper end portion of the guide member 14. The stay 15 of the head rest 4 is provided with a notch 15a for engaging with the spring 16 and holding the stay 15 when the stay 15 is inserted into the guide member 14.

In FIG. 2, reference numeral 17 denotes a rear package tray.

In the rear seat 1 constructed as described above, securing of the seat back 3 to the vehicle body 5 and mounting of the head rest 4 on the seat back 3 are effected simultaneously by pushing the seat back 3 against the vehicle body 5 until the support section 9 of the vehicle body 5 fits into the recess section 11 on the rear surface of the seat back 3, inserting the stays 15, 15 of the head rest 4 into the bushings 13, 13 of the recess section 11 from above the seat back 3, and further inserting the stays 15, 15 into the guide members 14, 14 of the support section 9 until the notch 15a engages with the spring 16. When the seat back 3 or the head rest 4 is to be removed, the head rest 4 is pulled up. As a result, the spring 16 disengages from the notch 15a along the oblique surface thereof. Then, the head rest 4 is further pulled out of the support holes 12, 12 and 9a, 9a. In this manner, removal of the seat back 3 becomes possible.

In this embodiment, since the seat back 3 may be secured to the vehicle body 5 only by mounting the head rest 4, it it possible to simplify the configuration for securing the seat back 3. Further, since the head rest 4 is mounted on the support section 9 of the vehicle body 5, it is possible to improve the mounting strength.

The aforesaid securing configuration is applicable also to the case where the rear package panel 5b is provided with an opening and the seat back 3 is inclinable forwardly to communicate the passenger cabin with the luggage compartment. In this case, inclination of the seat back 3 is locked by mounting of the head rest 4.

Also, instead of providing the notch 15a and the spring 16 for holding the head rest 4 as described above, a similar mechanism may be positioned between the seat back 3 and the head rest 4, and the spring may be disengaged by a knob operation. Further, a plurality of notches may be provided for making the mounting height of the head rest 4 variable.

Figure 5:
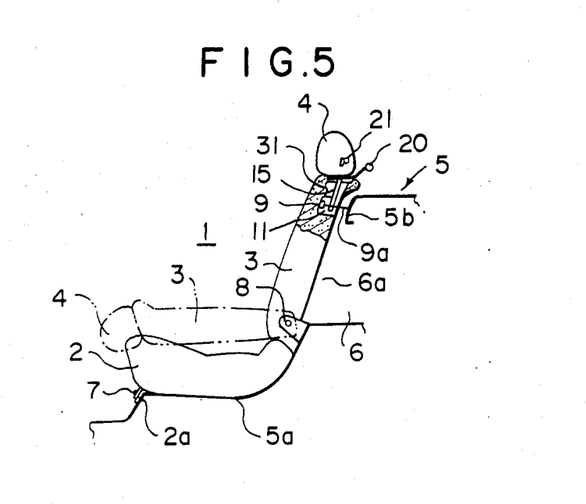
FIG. 5 is a partially sectional side view showing another embodiment for the rear seat apparatus in accordance with the present invention.
Figure 6:
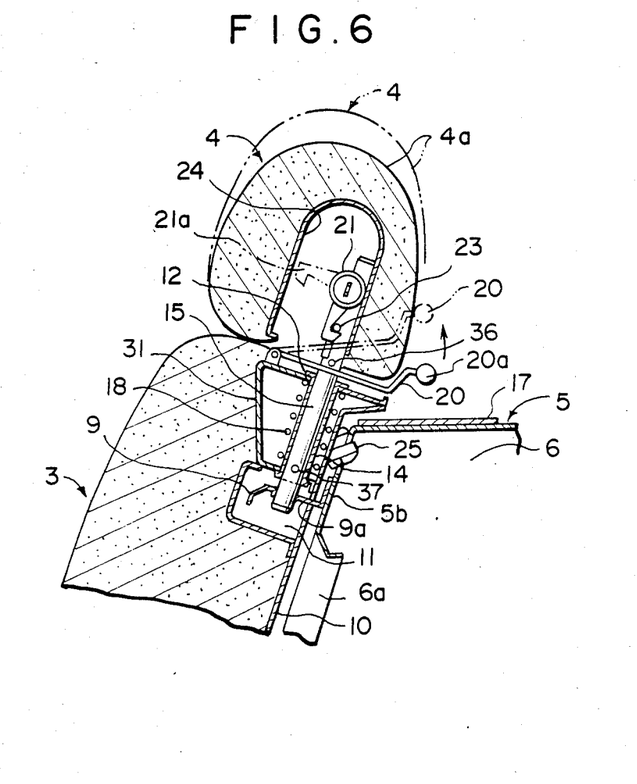
FIGS. 6 and 7 are sectional side view and a sectional front view showing the upper section of the rear seat in the embodiment of FIG. 5.
Figure 7:
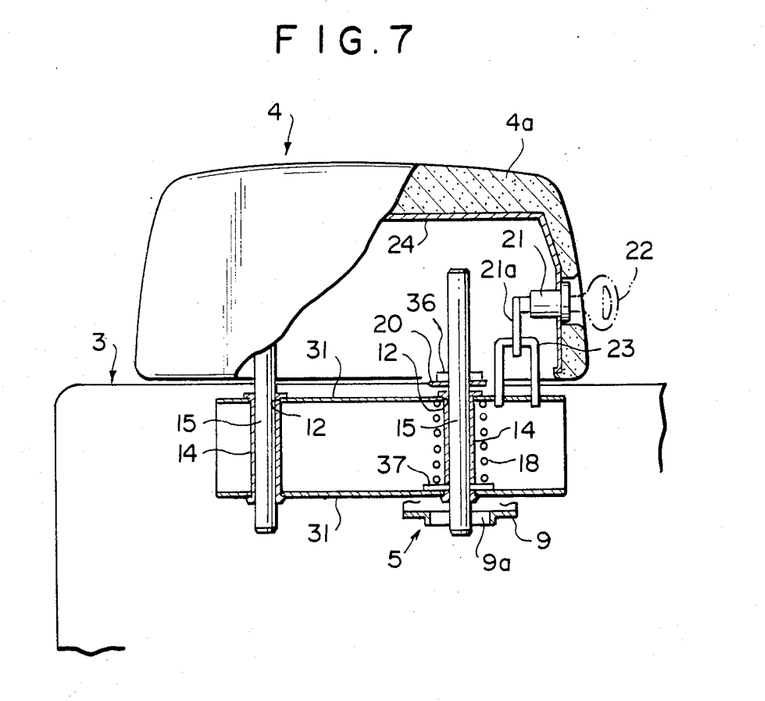

FIGS. 5, 6 and 7 show another embodiment of the rear seat apparatus in accordance with the present invention.

In this embodiment, the seat back 3 partitions the passenger cabin from the luggage compartment 6 of the vehicle body 5 and is inclinable forwardly to open a communicating section 6a positioned on the front side of the luggage compartment 6 for communicating the passenger cabin with the luggage compartment 6. The seat back 3 is inclinably supported at it lower end portion by a hinge bracket 8.

The seat back 3 is provided with an auxiliary frame 31 inside of the upper end portion of the seat frame 10. The auxiliary frame 31 is shaped in a channel form, and the upper and lower edges thereof are secured to the seat frame 10 to form a closed cross-section extending transversely to the vehicle body 5. Support holes 12, 12 are perforated vertically through the auxiliary frame 31, and cylindrical plastic guide members 14, 14 are fitted into the support holes 12, 12. The recess 11 is provided under the auxiliary frame 31 on the upper rear surface of the seat back 3.

The forwardly projecting support section 9 is secured to the front surface of the rear package panel 5b above the communicating section 6a of the vehicle body 5 at a position corresponding to the upper section of the seat back 3. The support section 9 is positioned to fit into the recess section 11 of the seat back 3. The support section 9 of the vehicle body 5 has an oblique front end portion, and a support hole 9a at the center.

The stay 15 of the head rest 4 has an upper pin 36 and a lower pin 37 respectively secured to the upper portion and the lower portion of the stay 15. The lower pin 37 is inserted through the guide member 14 and vertically moveable integrally with the stay 15 inside of the auxiliary frame 31. A spring 18 is positioned in the contracted form between the lower pin 37 and the upper wall of the auxiliary frame 31. The stay 15 is urged downwardly by the spring 18 to pull down the head rest 4. The lower pin 37 is stopped in contact with the inner surface of the lower wall of the auxiliary frame 31. The upper pin 36 is secured to the stay 15 above the guide member 14 and below the main body 4a of the head rest 4. The lower surface of the upper pin 36 is engaged with the intermediate section of a lock lever 20. The front end portion of the lock lever 20 is pivotably supported on the upper surface of the auxiliary frame 31 of the seat back 3. The lock lever 20 has a knob 20a at the rear end portion. By moving the knob 20a up, the stay 15 is slid up against the spring 18 to move up the head rest 4.

The end portion of the stay 15 is tapered for insertion into the support hole 9a of the support section 9 of the vehicle body 5.

An inner panel 24 of the head rest 4 is provided with a cylinder lock 21 on one side, and a hook 21a is rotatable by an operation of a key 22 in the cylinder lock 21. An engagement section 23 is projected out of the upper surface of the auxiliary frame 31 of the seat back 3 at a position corresponding to the hook 21a for engagement with the hook 21a of the cylinder lock 21.

In FIG. 6, reference numeral 25 denotes cushion rubber.

In this embodiment, securing of the seat back 3 to the vehicle body 5 is effected by pushing the seat back 3 against the vehicle body 5 on the rear side until the support section 9 of the vehicle body 5 fits into the recess section 11, and engaging the end of the stay 15 of the head rest 4 with the support hole 9a of the support section 9 of the vehicle body 5.

When the seat back 3 is inclined forwardly to communicate the passenger cabin with the luggage compartment 6, the knob 20a of the lock lever 20 is raised as indicated by the chain line in FIG. 6. As a result, the stay 15 is moved up against the spring 18 together with the head rest 4 by the upper pin 36 in engagement with the lock lever 20. In this manner, the end portion of the stay 15 disengages from the support hole 9a of the support section 9, and forward inclination of the seat back 3 becomes possible. When the lock lever 20 is released, the stay 15 is moved down by the spring 18, and stopped with the lower pin 37 contacting the auxiliary frame 31. When the seat back 3 inclined forwardly is returned to the erect condition, the stay 15 is moved with its tapered end surface contacting the front oblique end portion of the support section 9 as the seat back 3 is erected, and the stay 15 engages finally with the support hole 9a.

To make inclination of the seat back 3 impossible, for example, for preventing stealing of articles in the luggage compartment 6, the key 22 is inserted into the cylinder lock 21 and rotated. As a result, the hook 21a is rotated, and the end portion thereof engages with the engagement section 23 of the seat back 3. Therefore, even though the lock lever 20 is operated, upward movement of the head rest 4 is restricted by the engagement of the hook 21a with the engagement section 23, and upward movement of the stay 15 is made impossible. Thus it becomes possible to release the engagement of the end portion of the stay 15 with the support section 9, and inclination of the seat back 3 is locked.

In the embodiment of FIG. 5, since securing and locking of the seat back 3 to the vehicle body 5 are effected by utilization of the stay 15 of the head rest 4, it is possible to simplify the configuration and to obtain secure operations.

Though the cylinder lock 21 is provided on the head rest 4 and the engagement section 23 is provided on the seat back 3, it is also possible to provide the engagement section on the head rest 4 and the cylinder lock on the seat back 3.

Further, both stays 15, 15 may be provided with the support section 9 to improve the head rest mounting strength. Also, the head rest holding mechanism comprising the clip-like spring 16 and the notch 15a as shown in FIGS. 2 and 4 may be provided as described above.

Figure 8:
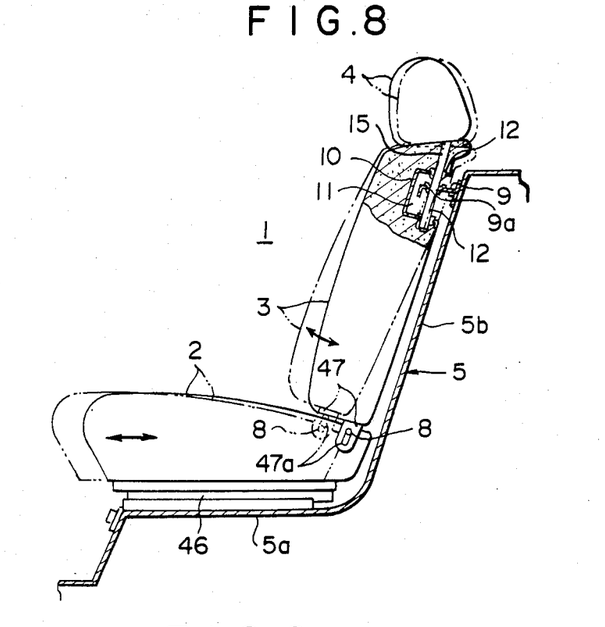
FIG. 8 is a partially sectional side view showing a further embodiment of the rear seat apparatus in accordance with the present invention.
Figure 9:
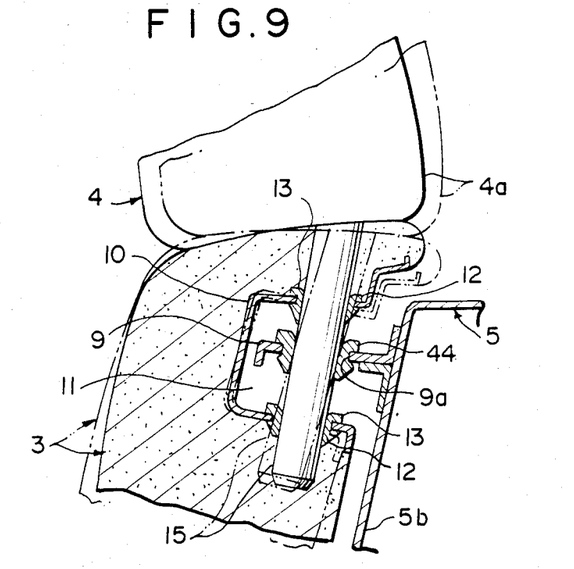
FIG. 9 is a sectional side view showing the upper section of the rear seat in the embodiment of FIG. 8.

FIGS. 8 and 9 show a further embodiment of the rear seat apparatus in accordance with the present invention. In this embodiment, the seat cushion 2 is supported by a rail member 46 on the floor 5a of the vehicle body 5 so that the seat cushion 2 is moveable in the longitudinal direction of the vehicle body 5. The lower end portion of the seat back 3 is provided with a bracket 47 having a long slot 47a for engagement with a pin 8 provided at the rear end portion of the seat cushion 2. Support holes 12, 12 are perforated through the upper wall and the lower wall of the recess section 11 of the seat back 3, and ring-like bushings 13, 13 are fitted to the inner circumferences of the support holes 12, 12. The support section 9 of the vehicle body 5 is fabricated of a plate material extending transversely of the vehicle body, and support holes 9a, 9a are perforated vertically through the support section 9 at different positions in the transverse direction of the vehicle body 5. Ring-like bushings 44, 44 fabricated of a plastic material, or the like are fitted into the support holes 9a, 9a.

The stays 15, 15 of the head rest 4 are inserted through the support holes 12, 12 of the seat back 3 and through the support holes 9a, 9a of the support section 9, i.e. through the bushings 13, 13 and bushings 44, 44. Each of the stays 15, 15 is supported on the seat back 3 by the upper and lower bushings 13, 13 of the recess section 11, and is supported on the support section 9 by a single bushing 44. The seat back 3 is supported via the stays 15, 15 so that the lower end portion of the seat back 3 is swingable around the supporting points of the support section 9 for the stays 15, 15.

In this embodiment, securing of the seat back 3 to the vehicle body 5 and mounting of the head rest 4 on the seat back 3 are carried out simultaneously by pushing the seat back 3 against the vehicle body 5 until the support section 9 of the vehicle body 5 fits into the recess 11, and inserting the stays 15, 15 of the head rest 4 into the bushing 13 of the upper support hole 12 of the recess section 11, the bushing 44 of the support hole 9a of the support section 9, and then the bushing 13 of the lower support hole 12 of the recess section 11. The seat back 3 or the head rest 4 may be removed by moving the head rest 4 up and pulling the stays 15, 15 out of the support holes 12 and 9a.

In this embodiment, when the seat cushion 2 is at the retracted position as indicated by the solid line in FIGS. 8 and 9, the pin 8 of the seat cushion 2 is positioned at the upper end of the long slot 47a at the bottom of the seat back 3. When the seat cushion 2 is slid forwardly as indicated by the chain line, the lower end portion of the seat back 3 is moved forwardly. However, the pin 8 of the seat cushion 2 moves down along the long slot 47a to accommodate a change in the position of engagement between the pin 8 and the long slot 47a as the seat back 3 is inclined.

The upper portion of the seat back 3 is allowed to incline around the supporting points of the stays 15, 15 of the head rest 4 on the support section 9, and the whole seat back 3 inclines. Though the stays 15, 15 may move down along the support holes 9a, 9a of the support section 9 as the seat back 3 is inclined, such a downward movement is made unnecessary by the long slot 47a.

In the embodiment of FIG. 8, instead of providing the pin 8 at the rear end portion of the seat cushion 2 and the bracket 47 having the long slot 47a at the lower end portion of the seat back 3, it is also possible to position the bracket having the long slot on the side of the seat cushion 2 and to provide the engagement pin on the side of the seat back 3.

I claim:

1. A rear seat apparatus for an automobile in which a rear seat constituted by a seat cushion, a seat back and a head rest is secured to a vehicle body, wherein the improvement comprises:
   (i) forming a forwardly projecting support section on said vehicle body at a position corresponding to an upper portion of said seat back,
   (ii) forming a recess section for receiving said support section on a rear surface of said seat back,
   (iii) constituting said head rest by a main body and stays extending downwardly of said main body, and
   (iv) inserting said stays into support holes formed through the upper portion of said seat back and through said support section, thereby securing said seat back to said vehicle body.

2. An apparatus as defined in claim 1 wherein said support section is shaped in a channel form, upper and lower edges thereof are secured to said vehicle body to constitute a closed cross-section extending in the transverse direction of said vehicle body, and the support holes through which said stays of said head rest are passed are formed through upper and lower walls of said channel-like support section at different positions in the transverse direction of said vehicle body.

3. An apparatus as defined in claim 2 wherein cylindrical guide members fabricated of a synthethic resin are fitted to said support holes.

4. An apparatus as defined in claim 1, 2 or 3 wherein said head rest is held at the inserted position by engagement of a notch formed on at least one of said stays with a spring.

5. A rear seat apparatus for an automobile in which a rear seat constituted by a seat cushion, a forwardly inclinable seat back, and a head rest mounted on an upper end portion of the seat back is secured to a vehicle body, and a passenger cabin and a luggage compartment are partitioned from each other by the rear seat, wherein the improvement comprises:
   (i) forming a forwardly projecting support section on said vehicle body at a position corresponding to an upper portion of said seat back,
   (ii) forming a recess section for receiving said support section on a rear surface of said seat back,
   (iii) constituting said head rest by a main body and stays extending downwardly of said main body,
   (iv) supporting said stays by inserting them into support holes formed through the upper portion of said seat back and said support section, and
   (v) mounting a key-operated cylinder lock on either one of said head rest and said seat back, said lock being provided with a hook section for engagement with a locking section.

6. An apparatus as defined in claim 5 wherein an auxiliary frame is positioned above said recess section of a seat frame of said seat back, said auxiliary frame is shaped in a channel form, upper and lower edges thereof are secured to said seat frame to constitute a closed cross-section extending in the transverse direction of said vehicle body, and the support holes through which said stays of said head rest are passed are formed through upper and lower walls of said channel-like auxiliary frame at different positions in the transverse direction of said vehicle body.

7. An apparatus as defined in claim 6 wherein cylindrical guide members fabricated of a synthetic resin are fitted to said support holes.

8. An apparatus as defined in claim 7 wherein a lower pin is secured to a lower portion of said stay, said lower pin is inserted through said guide member and is vertically moveable integrally with said stay inside of said auxiliary frame, and a spring is positioned in the contracted form between said lower pin and the upper wall of said auxiliary frame.

9. An apparatus as defined in claim 8 wherein an upper pin is secured to an upper portion of said stay, and a lower surface of said upper pin is engaged with a lock lever pivotably supported on said auxiliary frame.

10. An apparatus as defined in claim 7 wherein an upper pin is secured to an upper portion of said stay, and a lower surface of said upper pin is engaged with a lock lever pivotably supported on said auxiliary frame.

11. A rear seat apparatus for an automobile in which a rear seat constituted by a seat cushion, a seat back and a head rest is mounted on a vehicle body, wherein the improvement comprises:
  (i) forming a forwardly projecting support section on said vehicle body at a position corresponding to an upper portion of said seat back,
  (ii) forming a recess section for receiving said support section on a rear surface of said seat back,
  (iii) constituting said head rest by a main body and stays extending downwardly of said main body,
  (iv) inserting said stays into support holes formed through the upper portion of said seat back and through said support section, thereby securing said seat back to said vehicle body,
  (v) supporting said seat cushion for movement in the longitudinal direction of said vehicle body by a rail member, and
  (vi) supporting a lower end portion of said seat back on said seat cushion via a long slot, so that said seat back inclines around said support section for said stays when said seat cushion is moved forwardly in the longitudinal direction of said vehicle body.

12. An apparatus as defined in claim 11 wherein the support holes through which said stays of said head rest are passed are perforated through upper and lower walls of said recess section of said seat back, ring-like bushings fabricated of a synthetic resin are fitted to inner circumferences of said support holes, said support section is fabricated of a plate material secured at a base portion to said vehicle body and extending in the transverse direction of said vehicle body, the support holes through which said stays of said head rest are passed are perforated through said support section at different positions in the transverse direction of said vehicle body, and ring-like bushings fabricated of a synthetic resin are fitted respectively to said support holes of said support section.

* * * * *